(12) United States Patent
Liang et al.

(10) Patent No.: US 12,037,268 B1
(45) Date of Patent: Jul. 16, 2024

(54) METHOD FOR TREATING SULFUR-CONTAINING ORGANIC WASTEWATER

(71) Applicants: CHINA PETROLEUM & CHEMICAL CORPORATION, Beijing (CN); CHINA PETROLEUM&CHEMICAL CO., LTD. OF NORTH BRANCH, Zhengzhou (CN)

(72) Inventors: Wenlong Liang, Zhengzhou (CN); Xiaoqing Qiu, Zhengzhou (CN); Xiang Wang, Zhengzhou (CN); Yi Luo, Zhengzhou (CN); Guofeng Li, Zhengzhou (CN); Changyu Yao, Zhengzhou (CN); Zhijun Gao, Zhengzhou (CN); Xianyi Chen, Zhengzhou (CN); Xiaoming Li, Zhengzhou (CN); Fuguo Li, Zhengzhou (CN); Xinge Jiang, Zhengzhou (CN); Youliang Cen, Zhengzhou (CN); Ruiyang Wang, Zhengzhou (CN); Lei Li, Zhengzhou (CN); Ruixia Wang, Zhengzhou (CN); Puyan Hou, Zhengzhou (CN); Binghua Dang, Zhengzhou (CN)

(73) Assignees: CHINA PETROLEUM & CHEMICAL CORPORATION, Beijing (CN); CHINA PETROLEUM & CHEMICAL CO., LTD. OF NORTH BRANCH, Hangzhou (CN)

( * ) Notice: Subject to any disclaimer, the term of this patent is extended or adjusted under 35 U.S.C. 154(b) by 0 days.

(21) Appl. No.: 18/427,742

(22) Filed: Jan. 30, 2024

Related U.S. Application Data

(63) Continuation of application No. PCT/CN2023/095313, filed on May 19, 2023.

(30) Foreign Application Priority Data

Mar. 1, 2023 (CN) .......................... 202310215973.6

(51) Int. Cl.
  $C02F\ 1/32$ (2023.01)
  $C02F\ 1/72$ (2023.01)
  $C02F\ 1/78$ (2023.01)

(52) U.S. Cl.
  CPC .............. $C02F\ 1/325$ (2013.01); $C02F\ 1/725$ (2013.01); $C02F\ 1/78$ (2013.01); $C02F\ 2101/40$ (2013.01); $C02F\ 2305/10$ (2013.01)

(58) Field of Classification Search
  CPC .. $C02F\ 1/78$; $C02F\ 1/32$; $C02F\ 101/30$; $C02F\ 103/10$; $C02F\ 1/48$; $C02F\ 1/36$; $C02F\ 1/72$; $C07C\ 27/00$
  See application file for complete search history.

(56) References Cited

U.S. PATENT DOCUMENTS

| 2005/0023934 | A1* | 2/2005 | Takeuchi | .............. B06B 1/0622 310/334 |
| 2016/0023934 | A1* | 1/2016 | Smith | ....................... C02F 9/00 210/199 |
| 2019/0092662 | A1* | 3/2019 | Kubota | ............... B01F 35/2132 |

FOREIGN PATENT DOCUMENTS

| CN | 208022860 U | 10/2018 |
| CN | 209178182 U | 7/2019 |

(Continued)

*Primary Examiner* — Walter D. Griffin
*Assistant Examiner* — Cameron J Allen

(57) ABSTRACT

Disclosed is a method for treating sulfur-containing organic wastewater by integrating an energy supply unit and a treatment unit into an integrated device. The treatment unit is used to purify sulfur-containing organic wastewater with an initial concentration of organic sulfur, so that the organic sulfur content in the treated sulfur-containing organic wastewater is within a preset range to enable the device to (Continued)

efficiently purify and treat sulfur-containing organic wastewater with different initial concentrations of organic sulfur, the efficiency of purifying sulfur-containing organic wastewater can be improved to a certain extent, the purification cost can be reduced, and the competitiveness of enterprise can be enhanced.

5 Claims, 8 Drawing Sheets

(56) References Cited

FOREIGN PATENT DOCUMENTS

| | | |
|---|---|---|
| CN | 110563223 A | 12/2019 |
| CN | 113003850 A | 6/2021 |
| CN | 113149154 A | 7/2021 |
| CN | 113428967 A | 9/2021 |
| CN | 114713280 A | 7/2022 |
| CN | 217780957 U | 11/2022 |

* cited by examiner

METHOD FOR TREATING SULFUR-CONTAINING ORGANIC WASTEWATER

FIELD OF THE DISCLOSURE

The disclosure relates to the technical field of oil and gas field wastewater treatment, in particular to a method for treating sulfur-containing organic wastewater.

BACKGROUND

In the production process of oil and gas, operations such as fracturing fluid backflow will bring organic sulfur from formation to the surface, resulting in production wastewater containing organic sulfur. Due to the extremely low odor threshold of organic sulfur compounds, their strong odor will have a negative impact on human production and life.

At present, industrial methods for treating organic sulfur include physical masking method, chemical absorption method, chemical oxidation method, and biological treatment method. The physical masking method cannot fundamentally treat organic sulfur, but only masks the odor. The chemical absorption method mainly uses desulfurizers to chemically absorb organic sulfur, which is more suitable for the removal of organic sulfur in the gas phase. However, it has the disadvantages of low efficiency and high cost when used for the treatment of organic sulfur in the aqueous phase. The chemical oxidation method mainly uses chemical oxidants to oxidize organic sulfur in wastewater, and the treatment process and equipment are relatively simple. However, the on-site storage and cost of oxidants limit their application in oil and gas fields. The biological treatment method has the problem of long processing time and high requirements for on-site management personnel. Therefore, it is necessary to develop a new method and device for the treatment of sulfur-containing organic wastewater suitable for oil and gas field.

Therefore, a method for treating sulfur-containing organic wastewater is urgently needed to solve the above technical problems.

SUMMARY

The purpose of this disclosure is to provide a method for treating sulfur-containing organic wastewater to solve the technical problem of high cost in treating sulfur-containing organic wastewater using existing treatment methods.

This disclosure provides a method for ship detection and tracking, comprising:
providing a device for treating sulfur-containing organic wastewater, comprising a device body with a reaction chamber, an energy supply unit set outside the device body, and a treatment unit;
adding sulfur-containing organic wastewater with an initial concentration of organic sulfur into the reaction chamber through the inlet of the device body, wherein the initial concentration ranges between $10^{-5}$ mg/L and 10000 mg/L;
purifying the sulfur-containing organic wastewater through the treatment unit to ensure that organic sulfur content in the treated sulfur-containing organic wastewater is within a preset range;
wherein: method of purifying the sulfur-containing organic wastewater through the treatment unit comprises: when the initial concentration ranges between $10^{-5}$ mg/L and 1 mg/L, only using ultraviolet generator in the treatment unit to purify the sulfur-containing organic wastewater; when the initial concentration ranges between 1 mg/L and 100 mg/L, using a combination of ultraviolet generator and ozone generator in the treatment unit to purify the sulfur-containing organic wastewater; when the initial concentration ranges between 100 mg/L and 10000 mg/L, adding catalyst to the sulfur-containing organic wastewater, and using a combination of UV generator and ozone generator in the treatment unit to purify the sulfur-containing organic wastewater.

Compared with the prior art, the beneficial effects of this disclosure are: this disclosure provides a method for treating sulfur-containing organic wastewater, and a device for treating sulfur-containing organic wastewater is provided by integrating an energy supply unit and a treatment unit into an integrated device. The treatment unit is used to purify sulfur-containing organic wastewater with an initial concentration of organic sulfur, so that the organic sulfur content in the treated sulfur-containing organic wastewater is within a preset range. This enables the device to efficiently purify sulfur-containing organic wastewater with different initial concentrations of organic sulfur, thereby improving the efficiency of purifying sulfur-containing organic wastewater, reducing purification costs, and enhancing enterprise competitiveness to a certain extent.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The technical solutions in the embodiments of the application will be described clearly and completely in combination with the drawings in the embodiments of the application.

Please refer to FIG. 1 to FIG. 12, this disclosure provides a device 1000 and a method for treating sulfur-containing organic wastewater. The device 1000 comprises a device body 100 with a reaction chamber 1, an energy supply unit 2, and a treatment unit 200. The energy supply unit 2 is used to provide power output to the device 1000, and the treatment unit 200 is used to purify and treat sulfur-containing organic wastewater with an initial concentration of organic sulfur to ensure that the organic sulfur content in the treated sulfur-containing organic wastewater is within a preset range, wherein the initial concentration of organic sulfur ranges from $10^{-5}$ mg/L to 10000 mg/L.

The device 1000 for treating sulfur-containing organic wastewater provided by this disclosure integrates the energy supply unit 2 and the treatment unit 200 into an integrated device 1000, and the treatment unit 200 is used to purify the sulfur-containing organic wastewater with an initial concentration of organic sulfur, so that the organic sulfur content in the treated sulfur-containing organic wastewater is within the preset range to enable the device 1000 to efficiently purify and treat sulfur-containing organic wastewater with different initial concentrations of organic sulfur, the efficiency of purifying sulfur-containing organic wastewater can be improved to a certain extent, the purification cost can be reduced, and the competitiveness of enterprise can be enhanced.

The technical solution of this disclosure will be described in conjunction with specific embodiments.

Figure 1:
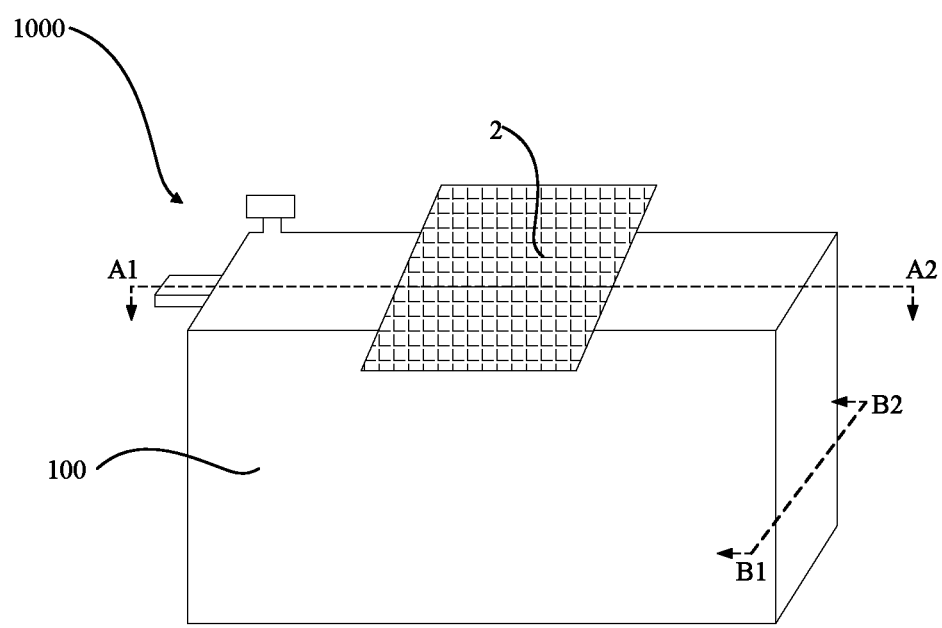
FIG. 1 is a schematic diagram of the overall structure of the device for treating sulfur-containing organic wastewater provided in the embodiment of this disclosure.
Figure 2:
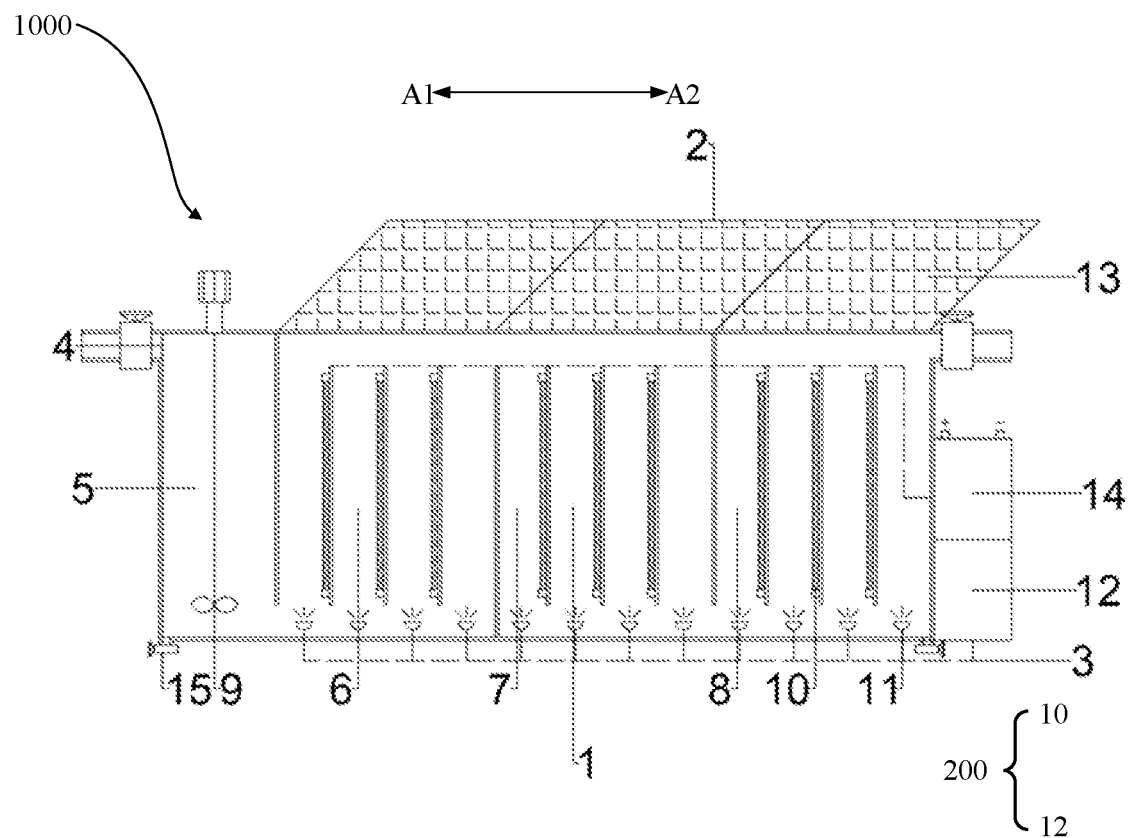
FIG. 2 is a cross-sectional view of the A1-A2 direction in FIG. 1.
Figure 3:
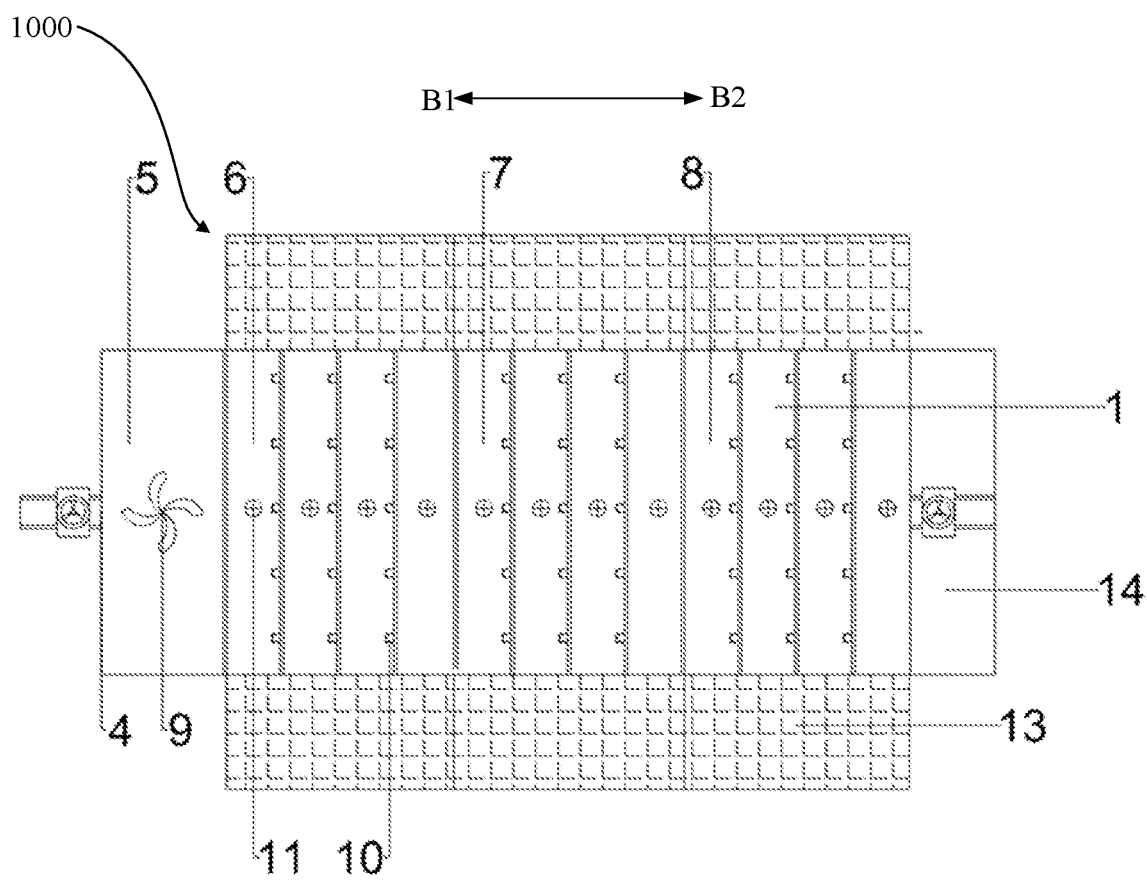
FIG. 3 is a cross-sectional view of the B1-B2 direction in FIG. 1.

Please refer to FIG. 1 to FIG. 3, FIG. 1 is the overall structure diagram of the device 1000 for treating sulfur-containing organic wastewater provided by the embodiment of this disclosure. FIG. 2 is the profile in the A1-A2 direction in FIG. 1. FIG. 3 is the profile in the B1-B2 direction in FIG. 1. Among them, according to FIG. 1 to FIG. 3, this disclosure provides a device 1000 for treating sulfur-containing organic wastewater, comprising a device body 100 with a reaction chamber 1, an energy supply unit 2 and a treatment unit 200. The energy supply unit 2 is set on the outside of the device body 100. The energy supply unit 2 is used to provide power output for the device 1000, and the treatment unit 200 is used to purify the sulfur-containing organic wastewater with an initial concentration of organic sulfur content, so that the organic sulfur content in the treated sulfur-containing organic wastewater will be within a preset range.

Wherein, the organic sulfur in sulfur-containing organic wastewater comprises mercaptan, thioether, and carbon disulfide, and the initial concentration is between $10^{-5}$ mg/L (0.01 ppm) and 10000 mg/L; when the initial concentration is less than 105 mg/L, the existing gas chromatograph is difficult to detect.

Please refer to FIG. 1 to FIG. 3, the treatment unit 200 comprises a UV light generator 10 located inside the reaction chamber 1 and an ozone generator 12 located outside the device body 100. Ozone aeration port 11 of the ozone generator 12 is connected to the bottom of the reaction chamber 1.

Specifically, UV generator 10 is used to generate ultraviolet light with different wavelengths. The ultraviolet light generated by UV generator 10 can completely decompose the organic sulfur pollutants in refractory wastewater under mild conditions at room temperature and atmospheric pressure. The basic principle is to degrade organic pollutants by high-energy photons, oxidants, and catalysts in the reaction system. Photons can activate organic functional groups, reduce the activation energy of the reaction, and help to strengthen the regeneration of the catalyst and the generation of free radicals, as well as the transfer and circulation of free radical reaction chains, thereby strengthening the oxidation capacity of the overall oxidation system, accelerating the oxidation reaction rate, and achieving the purpose of deodorization.

Specifically, the ozone generator 12 is a device 1000 for producing ozone gas. Ozone is prone to decomposition and cannot be stored. It needs to be produced on-site for use (in special circumstances, it can be stored for a short period of time), so any place where ozone can be used needs to use an ozone generator. Ozone generator 12 is widely used in fields such as drinking water, wastewater, industrial oxidation, food processing and preservation, pharmaceutical synthesis, and space sterilization.

In the embodiments of this disclosure, the ozone generated by the ozone generator 12 can combine free organic sulfur pollutant molecules with ozone oxidation to form small molecules of harmless or low harmful compounds, such as $H_2SO_4$, $CO_2$, $H_2O$, etc., thereby achieving deodorization effect. In the process of ozone deodorization, the cost is low and there is almost no need to add chemicals; The deodorization speed is fast, and the deodorization effect can usually be achieved in a few minutes; The ozone aeration advanced oxidation method has a higher efficiency in purifying sulfur-containing organic wastewater compared to ultraviolet photocatalysis. Ultraviolet photocatalysis is difficult to purify wastewater with completely high organic sulfur concentrations. On the contrary, the ozone aeration advanced oxidation method can remove higher concentrations of sulfur-containing organic wastewater.

Please refer to FIG. 2 and FIG. 3, the reaction chamber 1 is divided into four reaction chambers by partitions, including a first reaction chamber 5, a second reaction chamber 6, a third reaction chamber 7, and a fourth reaction chamber 8. The top of the first reaction chamber 5 is connected to the inlet of device 1000, the bottom of the first reaction chamber 5 is connected to the bottom of the second reaction chamber 6, and the top of third reaction chamber 7 is connected to the top of the second reaction chamber 6, The bottom of the fourth reaction chamber 8 is connected to the bottom of the third reaction chamber 7.

Specifically, the water inlet of the device body 100 is located at the top of one side away from the second reaction chamber 6 in the first reaction chamber 5, and is provided with a grid 4, which is used to prevent larger solid impurities in sulfur-containing organic wastewater from entering the reaction chamber 1. The outlet of the device body 100 is located at the bottom of one side of the reaction chamber 1.

Furthermore, a drainage outlet 15 for dredging is also provided on the side near the inlet at the bottom of reaction chamber 1 to remove impurities from sulfur-containing organic wastewater.

Specifically, the interior of the first reaction chamber 5 is provided with a stirring blade 9. Due to the possibility of strong acid or alkali mixing in sulfur-containing organic wastewater after leaving factory, it is necessary to adjust the pH value of the sulfur-containing organic wastewater to 6.5-7.5 using hydrochloric acid, sulfuric acid, sodium hydroxide, or sodium carbonate in the first reaction chamber 5 to avoid strong acid or alkali corrosion of the inner wall of the reaction chamber 1. Wherein, setting up the stirring blade 9 inside the first reaction chamber 5 is to regulate the pH value of the sulfur-containing organic wastewater more uniformly.

Specifically, the interior of the second reaction chamber 6, the third reaction chamber 7, and the fourth reaction chamber 8 are all provided with ultraviolet light generators 10. The ultraviolet light emitted by the ultraviolet light generator 10 can catalyze sulfur-containing organic wastewater by ultraviolet light, so that the free state organic sulfur pollutant molecules can be decomposed into small molecules of harmless or low harmful compounds, such as $H_2SO_4$, $CO_2$, $H_2O$, etc., thereby achieving the effect of deodorization.

Furthermore, the ultraviolet light generators 10 inside the second reaction chamber 6, the third reaction chamber 7, and the fourth reaction chamber 8 are arranged horizontally, and the distance between adjacent ultraviolet light generators 10 is between 0.5 m and 1 m, preferably 0.5 m.

Furthermore, different specifications of ultraviolet generators can be installed in the second reaction chamber 6, the third reaction chamber 7, and the fourth reaction chamber 8, but the ultraviolet wavelength must be less than 254 nm, and the electric power of the ultraviolet generator can be selected between 50 W and 100 W. This is because the wavelength of ultraviolet light is inversely proportional to energy, and the shorter the wavelength, the greater the energy. When the wavelength of ultraviolet light is greater than 254 nm, the purification effect of the ultraviolet light generated by the ultraviolet generator on sulfur-containing organic wastewater is not good.

Specifically, multiple ozone aeration ports 11 are provided at the bottom of the second reaction chamber 6, the third reaction chamber 7, and the fourth reaction chamber 8. The ozone generator 12 is fixed on the outer side of the reaction chamber 1, and is connected to the multiple ozone aeration ports 11 through the bottom of the reaction chamber 1 through an ozone pipeline system 3 to transport the ozone produced by the ozone generator 12 to the second reaction chamber 6, the third reaction chamber 7, and the fourth reaction chamber 8. Among them, the ozone generated by ozone generator 12 can perform advanced ozone aeration oxidation on sulfur-containing organic wastewater, so that free organic sulfur pollutant molecules can combine with ozone oxidation to form harmless or low harmful compounds such as $H_2SO_4$, $CO_2$, $H_2O$, and other small molecules, thereby achieving the effect of deodorization.

Please refer to FIG. 1 to FIG. 3, the energy supply unit 2 is located outside the device body 100. The energy supply unit 2 comprises a multi-layer deployable solar battery panel 13 located at the top of the device body 100 and a battery 14 located on one side of the device body 100;

Wherein, the solar battery panel 13 is used to convert external solar energy into electrical energy and charge the battery 14. The circuit of the battery 14 is electrically connected to the stirring blade 9, the ultraviolet light generator 10, and the ozone generator 12. The battery 14 is used to power the stirring blade 9, the ultraviolet light generator 10, and the ozone generator 12.

Specifically, the energy supply unit 2 can also choose and adapt to local climate wind turbines or photovoltaic power generation equipment.

Figure 4:
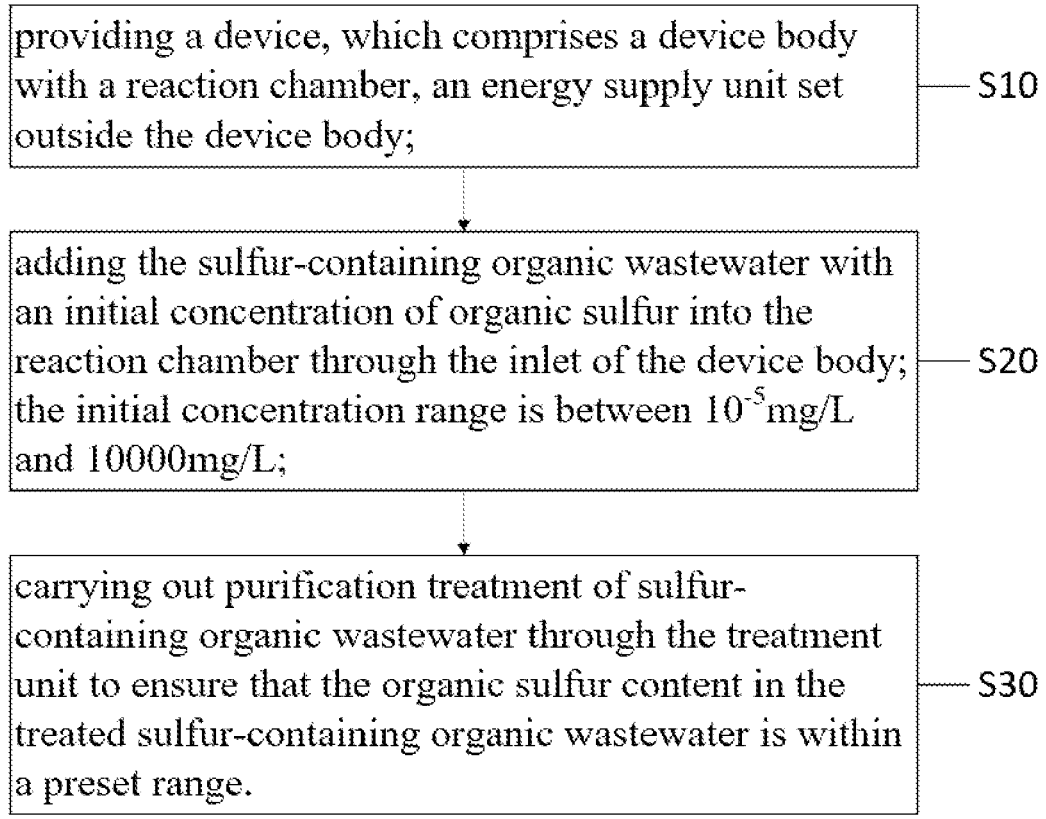
FIG. 4 is a flowchart of the method for treating sulfur-containing organic wastewater provided in an embodiment of this disclosure.

Correspondingly, please refer to FIG. 4, this disclosure also provides a method for treating sulfur-containing organic wastewater using the device 1000, which comprises:

S10, providing a device 1000, which comprises a device body 100 with a reaction chamber 1, an energy supply unit 2 set outside the device body 100, and a treatment unit 200.

Specifically, the S10 step also comprises:
providing a device 1000, the device 1000 comprises a device body 100 with a reaction chamber 1, an energy supply unit 2, and a treatment unit 200. The energy supply unit 2 is used to provide power output for the device 1000, and the treatment unit 200 is used to purify sulfur-containing organic wastewater with an initial concentration of organic sulfur, so that the organic sulfur content in the treated sulfur-containing organic wastewater is within a preset range.

S20, adding the sulfur-containing organic wastewater with an initial concentration of organic sulfur into the reaction chamber 1 through the inlet of the device body 100. The initial concentration range is between $10^{-5}$ mg/L and 10000 mg/L.

Specifically, step S20 also comprises: firstly, adjusting the pH value of sulfur-containing organic wastewater with an initial concentration of organic sulfur, so that the pH range of the sulfur-containing organic wastewater is between 6.5 and 7.5. Afterwards, adding the sulfur-containing organic wastewater with the initial concentration of organic sulfur into the reaction chamber 1 through the inlet of the device body 100. The initial concentration range is between $10^{-5}$ mg/L and 10000 mg/L.

S30, carrying out purification treatment of sulfur-containing organic wastewater through the treatment unit 200 to ensure that the organic sulfur content in the treated sulfur-containing organic wastewater is within a preset range.

Specifically, step S30 also comprises:
when the initial concentration range is between $10^{-5}$ mg/L and 1 mg/L (at which point the organic sulfur concentration in sulfur-containing organic wastewater is low), only the UV generator in the treatment unit 200 is used to purify the sulfur-containing organic wastewater;

Wherein, the UV generator is used to treat sulfur-containing organic wastewater with a UV intensity range of 2000 W to 5000 W per cubic meter volume, and a treatment time range of 10 min to 20 min.

When the initial concentration range is between 1 mg/L and 100 mg/L (at which point the organic sulfur concentration in sulfur-containing organic wastewater is moderate), a combination of UV generator in the treatment unit 200 and the ozone generator 12 is used to purify the sulfur-containing organic wastewater;

Wherein, the ultraviolet intensity range used by the ultraviolet generator to treat sulfur-containing organic wastewater per cubic meter volume is between 2000 W and 5000 W, the ozone concentration range used by the ozone generator 12 to treat sulfur-containing organic wastewater per cubic meter volume is between 20 mg/L and 30 mg/L, and the treatment time range used by the treatment unit 200 to treat the sulfur-containing organic wastewater is between 20 min and 30 min.

When the initial concentration range is between 100 mg/L and 10000 mg/L (at which point the organic sulfur concentration in sulfur-containing organic wastewater is high), adding catalyst to the sulfur-containing organic wastewater, and a combination of UV generator and ozone generator 12 in the treatment unit 200 is used to purify the sulfur-containing organic wastewater;

Wherein, the ultraviolet intensity range used by the ultraviolet generator to treat sulfur-containing organic wastewater per cubic meter volume is between 2000 W and 5000 W, the ozone concentration range used by the ozone generator 12 to treat sulfur-containing organic wastewater per cubic meter volume is between 20 mg/L and 30 mg/L, and the treatment time range used by the treatment unit 200 to treat sulfur-containing organic wastewater is between 20 min and 30 min; the catalyst is at least one of $TiO_2$, ZnO, CdS, $WO_3$, $SrTiO_3$, and $Fe_2O_3$, with a concentration of 100 mg/L per cubic meter of sulfur-containing organic wastewater.

Wherein, the preset range is from 0 to $10^{-5}$ mg/L; This is because the experimental instrument can only detect a concentration above $10^{-5}$ mg/L.

Specifically, treating different organic sulfur concentrations of wastewater according to the above methods for treating sulfur-containing organic wastewater, and detecting the organic sulfur concentration of the samples tested before and after treatment using a gas chromatograph. The chromatographic conditions are: stationary phase of the chromatographic column is polydimethylsiloxane, with a column length of 60 m, an inner diameter of 0.32 mm, and a membrane thickness of 4.2 μm; The inlet temperature is 190-260° C., and the split ratio is 30:1-300:1. The chromatography can be performed under a variable pressure, with an initial pre column pressure of 3-15 psi maintained for 0.2-1 minutes, and then increased to 13-20 psi at a rate of 30 psi/min. The chromatography can also be performed under a constant pressure, with a pre column pressure of 13-20 psi. The chromatography adopts a programmed heating operation, with an initial temperature of 35-50° C. and a first-order heating rate of 5-15° C./min, heating up to 90-110° C. and a second-order heating rate of 10-20° C./min, heating up to 170-220° C.

Embodiment 1

Adjusting the pH of 1 m3 of wastewater with an organic sulfur concentration of 0.9 mg/L (the first organic sulfur concentration) to 7.0 using sodium hydroxide. The wastewater passes through the inlet of the device 1000 and stays in the first reaction chamber 5 for a period of time after passing through the grid 4; after mixing well by the stirring blade 9, the wastewater enters the second reaction chamber 6. The second reaction chamber 6 is provided with an ultraviolet generator. The sulfur-containing organic wastewater is initially treated here. After the water level reaches a required level, the wastewater enters the third reaction chamber 7 and the fourth reaction chamber 8. Prolonging the stay time of the sulfur-containing organic wastewater, and purifying the sulfur-containing organic wastewater fully. After the water level reaches a required level, it is discharged at the drainage outlet 15. At this time, the ultraviolet light intensity power is 2000 W, and the purification treatment time is 20 min. The organic sulfur detection spectra of sulfur-containing organic wastewater before and after treatment is shown in FIG. 5 and FIG. 6.

Figure 5:
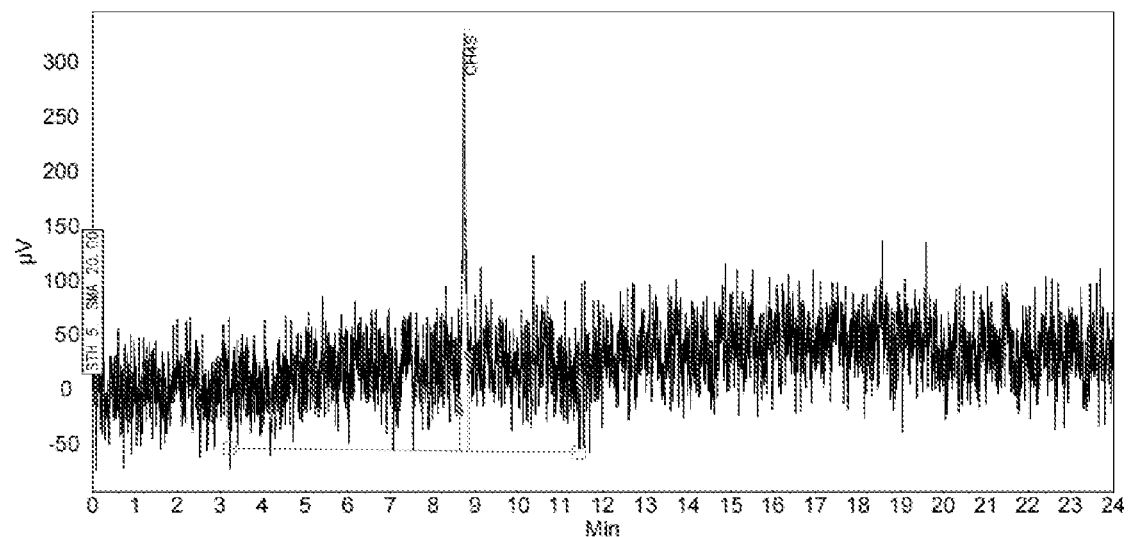
FIG. 5 shows the gas phase detection spectrum of the organic sulfur concentration in the sulfur-containing organic wastewater with the first organic sulfur concentration before purification treatment.
Figure 6:
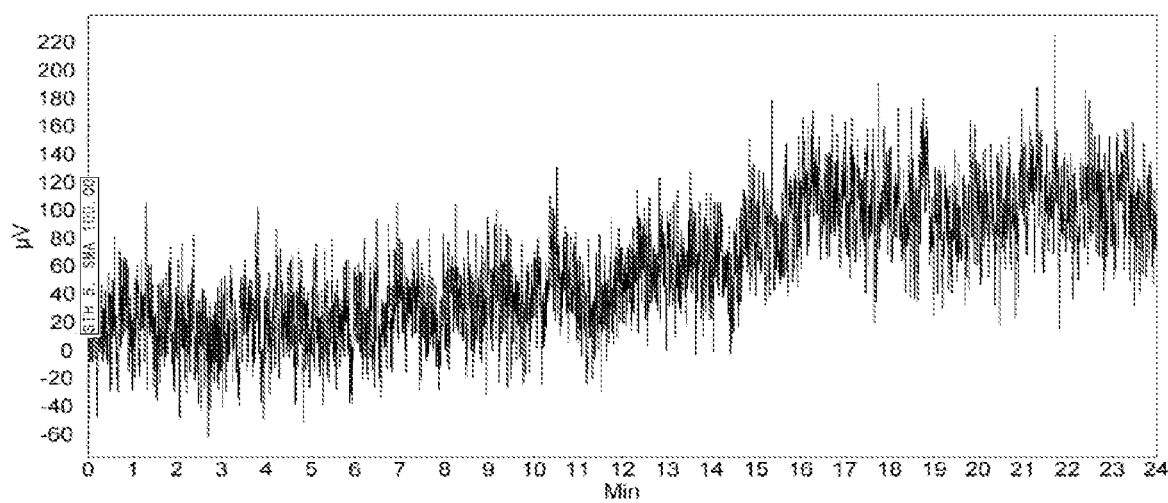
FIG. 6 shows the gas phase detection spectrum of the organic sulfur concentration in the sulfur-containing organic wastewater with the first organic sulfur concentration after purification treatment by the above device.

From FIG. 5, it can be seen that the sulfur-containing organic wastewater provided by Embodiment 1 has a certain peak area of $CH_4S$ characteristic peak from 8 min to 9 min, indicating that the sulfur-containing organic wastewater provided by Embodiment 1 contains a certain concentration of $CH_4S$ before treatment; from FIG. 6, it can be seen that the sulfur-containing organic wastewater provided by Embodiment 1 has no $CH_4S$ characteristic peak after treatment of the above device 1000, indicating that the sulfur-containing organic wastewater provided by Embodiment 1 has been completely purified.

Embodiment 2

Adjusting the pH of 1 m3 of wastewater with an organic sulfur concentration of 9.8 mg/L (second organic sulfur concentration) to 7.0 using sodium hydroxide. The wastewater passes through the inlet of the device 1000 and stays in the first reaction chamber 5 after passing through the grid 4; After mixing by the stirring blade 9, the wastewater enters the second reaction chamber 6, which is provided with a UV generator and an ozone generator 12. The sulfur-containing organic wastewater is preliminarily treated here, and after the water level reaches a required level, it enters the third reaction chamber 7 and the fourth reaction chamber 8. Prolonging the stay time of the sulfur-containing organic wastewater, and purifying the sulfur-containing organic wastewater fully. After the water level reaches a required level, the wastewater is discharged at the drainage outlet 15. At this time, the ultraviolet light intensity power is 2000 W, the ozone concentration is 30 mg/L, and the purification treatment time is 30 min. The organic sulfur detection spectra of sulfur-containing organic wastewater before and after treatment are shown in FIG. 7 and FIG. 8.

Figure 7:
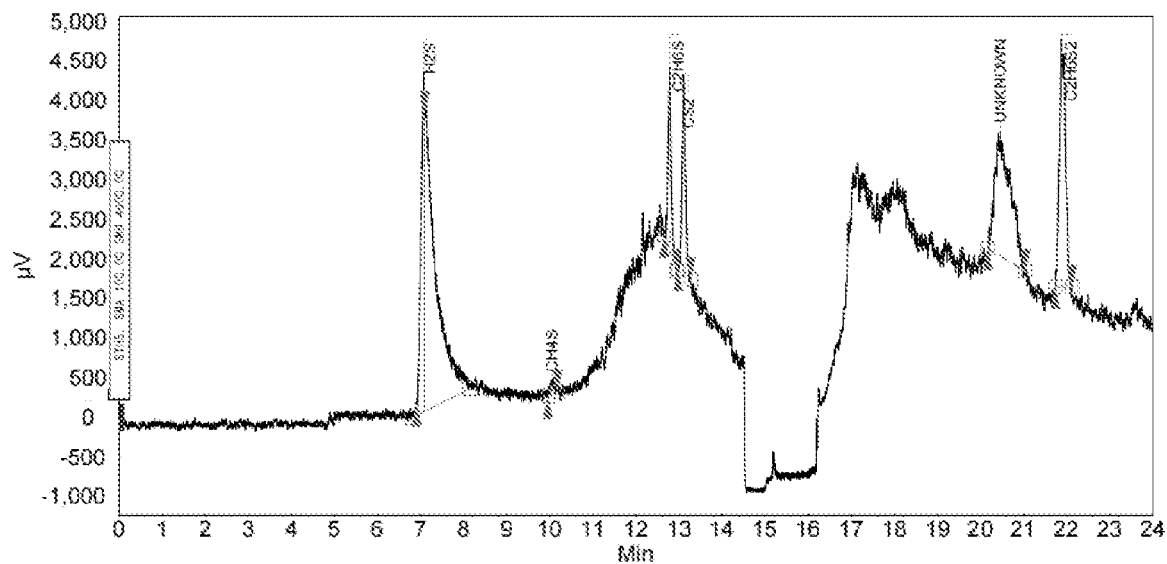
FIG. 7 shows the gas phase detection spectrum of the organic sulfur concentration in the sulfur-containing organic wastewater with the second organic sulfur concentration before purification treatment.
Figure 8:
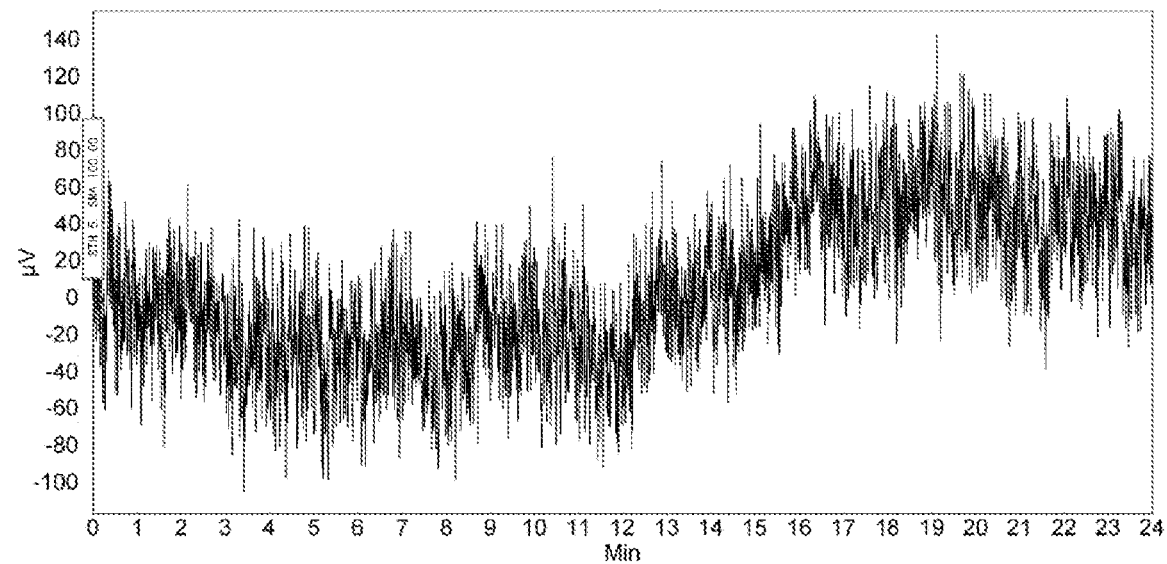
FIG. 8 shows the gas phase detection spectrum of the organic sulfur concentration in the sulfur-containing organic wastewater with the second organic sulfur concentration after purification treatment by the above device.

From FIG. 7, it can be seen that the sulfur-containing organic wastewater provided by Embodiment 2 shows a certain peak area of $H_2S$ characteristic peak at 7 min, a certain peak area of $CH_4S$ characteristic peak at 10 min, a certain peak area of $C_2H_6S$ characteristic peak and a certain peak area of $CS_2$ characteristic peak at 12 min to 13 min, and a certain peak area of $C_2H_6S_2$ characteristic peak at 22 min. From FIG. 8, it can be seen that the sulfur-containing organic wastewater provided by Embodiment 2 has no characteristic peak before treatment after treatment of the above device 1000, indicating that the sulfur-containing organic wastewater provided by Embodiment 2 has been completely purified.

Embodiment 3

Adjusting the pH of 1 m3 of wastewater with an organic sulfur concentration of 112.5 mg/L (third organic sulfur concentration) to 7.0 using sodium hydroxide. The wastewater passes through the inlet of the device 1000 and stays in the first reaction chamber 5 after passing through the grid 4; After mixing by the stirring blade 9, the wastewater enters the second reaction chamber 6, which is provided with a UV generator and an ozone generator 12. The sulfur-containing organic wastewater is preliminarily treated here, and after the water level reaches a required level, the wastewater enters the third reaction chamber 7 and the fourth reaction chamber 8. Prolonging the stay time of the sulfur-containing organic wastewater, and purifying the sulfur-containing organic wastewater fully. After the water level reaches a required level, the wastewater is discharged at the drainage outlet 15. At this time, the ultraviolet light intensity power is 3000 W, the ozone concentration is 30 mg/L, the purification treatment time is 30 min, and 10 mg/L $TiO_2$ is also added to the sulfur-containing organic wastewater. The organic sulfur detection spectra of sulfur-containing organic wastewater before and after treatment are shown in FIG. 9 and FIG. 10.

Figure 9:
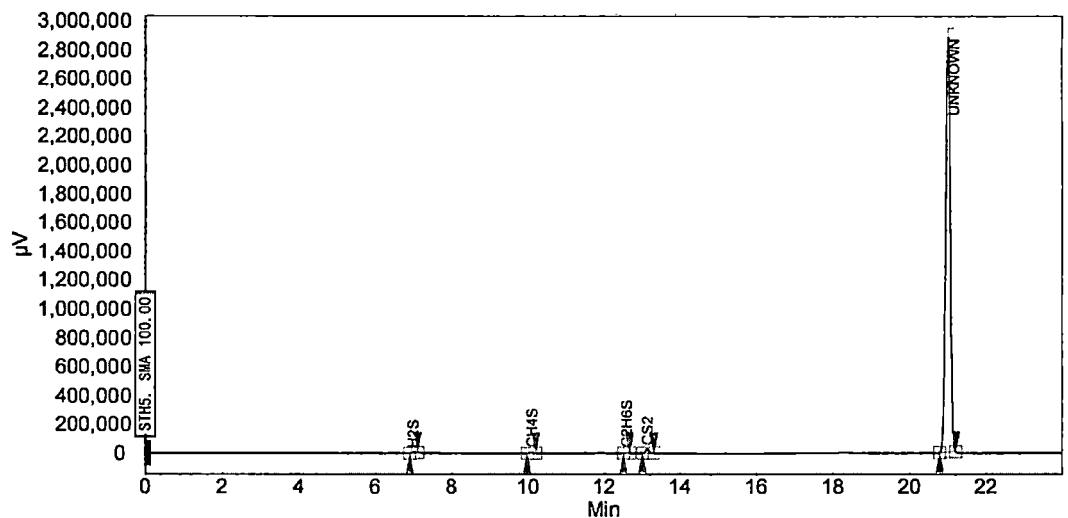
FIG. 9 shows the gas phase detection spectrum of the organic sulfur concentration in the sulfur-containing organic wastewater with the third organic sulfur concentration before purification treatment.
Figure 10:
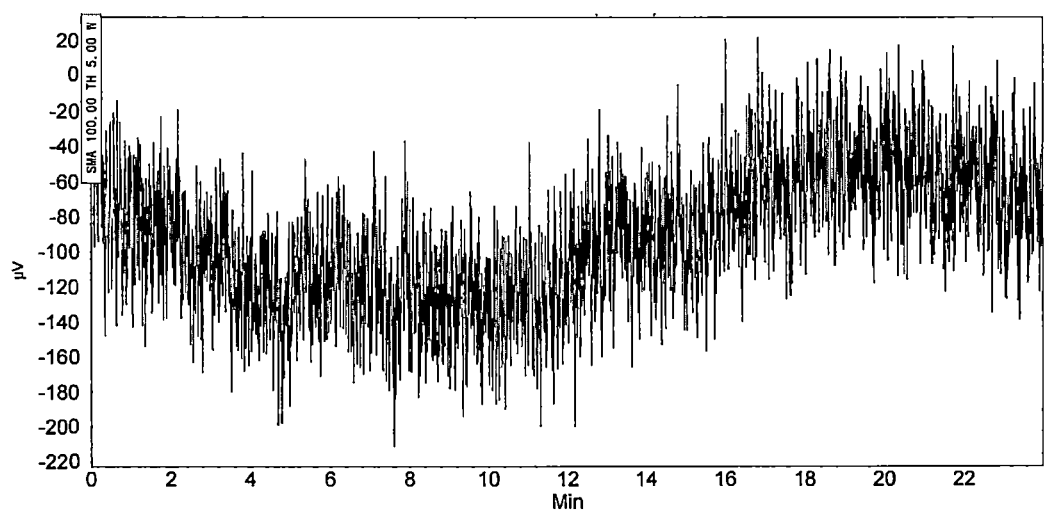
FIG. 10 shows the gas phase detection spectrum of the organic sulfur concentration in the sulfur-containing organic wastewater with the third organic sulfur concentration after purification treatment by the device.

It can be seen from FIG. 9 that the sulfur-containing organic wastewater provided by Embodiment 3 has a certain peak area of $H_2S$ characteristic peak at 7 min, a certain peak area of $CH_4S$ characteristic peak at 10 min, a certain peak area of $C_2H_6S$ characteristic peak and a certain peak area of $CS_2$ characteristic peak at 12 min to 13 min, and a certain peak area of $C_2H_6S_2$ characteristic peak at 22 min. From FIG. 10, it can be seen that the sulfur-containing organic wastewater provided by Embodiment 3 has no characteristic peaks before treatment after treatment of the above device 1000, indicating that the sulfur-containing organic wastewater provided by Embodiment 3 has been completely purified.

Accordingly, this disclosure also treats the sulfur-containing organic wastewater according to conventional chemical oxidation methods, and uses a gas chromatograph to detect the organic sulfur concentration of the samples tested before and after treatment. The specific process is as follows:

Comparison Embodiment 1

Adjusting the pH of 1 m3 of wastewater with an organic sulfur concentration of 25.7 mg/L to 7.0 using sodium hydroxide. Adding the wastewater to a treatment tank, then adding 6.25 g/L ammonium persulfate and 1 g/L sodium sulfite, and the treatment time is 20 minutes. The organic sulfur detection spectra of sulfur-containing organic wastewater before and after treatment are shown in FIG. 11 and FIG. 12.

Figure 11:
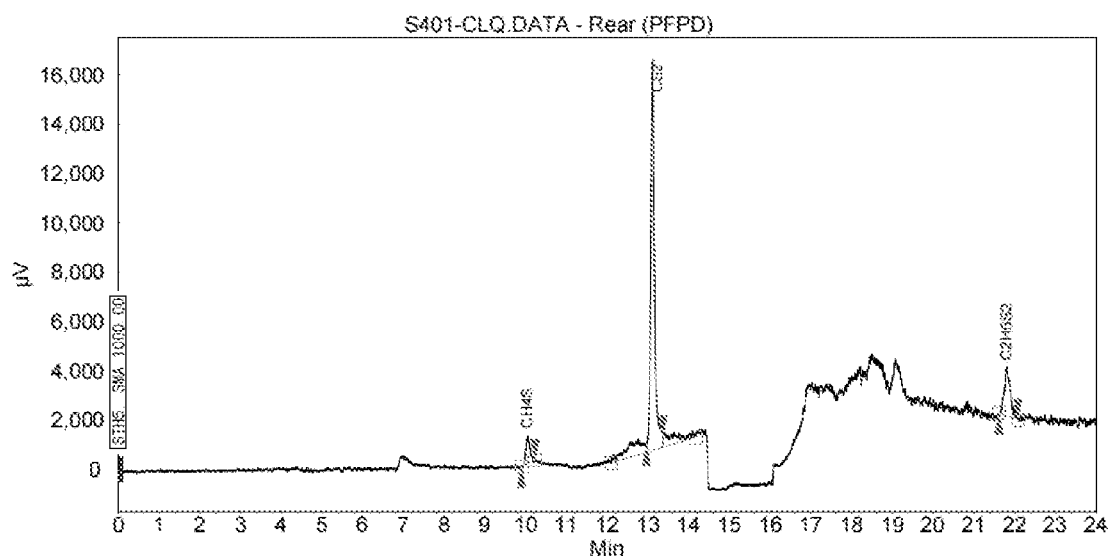
FIG. 11 shows the gas phase detection spectrum of the organic sulfur concentration in the fourth organic sulfur containing wastewater before purification treatment.
Figure 12:
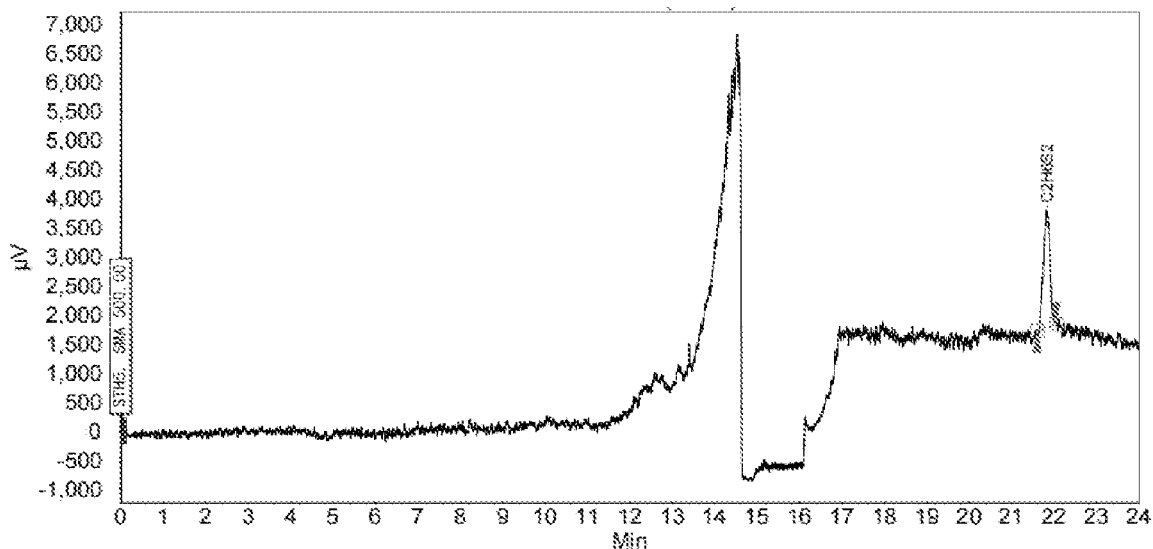
FIG. 12 shows the gas phase detection spectrum of the organic sulfur concentration in the fourth organic sulfur containing wastewater after conventional chemical purification treatment.

It can be seen from FIG. 11 that for the sulfur-containing organic wastewater provided by Comparison Embodiment 1, a certain peak area of $CH_4S$ characteristic peak appears at 10 min, a certain peak area of $CS_2$ characteristic peak appears from 13 min to 14 min, and a certain peak area of $C_2H_6S_2$ characteristic peak appears at 22 min. It can be seen from FIG. 12 that after the chemical oxidation treatment of the sulfur-containing organic wastewater provided by Comparison Embodiment 1, a certain peak area of $C_2H_6S_2$ characteristic peak still appears at 22 min, indicating that the sulfur-containing organic wastewater provided by Comparison Embodiment 1 is not completely purified.

According to the comparison between Embodiment 1, Embodiment 2, and Embodiment 3 and Comparison Embodiment 1, it can be seen that the device 1000 and method provided by this disclosure for treating sulfur-containing organic wastewater can completely purify organic wastewater with different organic sulfur concentrations.

This disclosure adopts a device 1000 based on ultraviolet photocatalytic ozone aeration advanced oxidation method for the integrated treatment of sulfur-containing organic wastewater without power. It conducts advanced oxidation of organic sulfur such as thiols, sulfides, and carbon disulfide in the wastewater to remove the foul odor of the wastewater. The above device 1000 utilizes ultraviolet light and ozone to construct an advanced oxidation system, using solar energy as the energy source for wastewater treatment, and integrates it into an integrated device.

Specifically, the above-mentioned device 1000 adopts an integrated unpowered design during wastewater operation, reducing power and electricity consumption. Energy supply unit 2 can choose different types of energy supply systems according to local climate, such as wind turbines, photovoltaic power generation systems, etc. The power generation equipment can be deployed on the top of device 1000, with a maximum utilization of three times the top area.

This device 1000 is an integrated pry mounted device, which can be carried by vehicles and applied to multiple well sites in the same area. During the transportation process, the internal processing device 1000 can continue to operate.

This device 1000 utilizes ultraviolet catalysis ozone advanced oxidation to treat sulfur-containing pollutant wastewater without the need for additional oxidants or desulfurizers. The device 1000 has a simple structure, convenient operation, and good treatment effect.

This device 1000 can conveniently adjust process parameters (such as retention time) to treat sulfur-containing wastewater to different depths according to different situations and reuse water quality requirements:

1. Low concentration sulfur-containing wastewater: air aeration+photocatalytic oxidation;
2. Medium concentration sulfur-containing wastewater: air aeration+photocatalytic oxidation, and adjusting the UV light intensity according to the actual situation;
3. High concentration sulfur-containing wastewater: ozone aeration+enhanced ultraviolet photocatalytic oxidation+catalyst, and refluxing to increase residence time according to actual conditions.

This disclosure also relates to a treatment method for sulfur-containing organic wastewater suitable for oil and gas field sites. This method utilizes ultraviolet light and ozone to construct an advanced oxidation system, using solar energy as the energy source for wastewater treatment, and integrates it into an integrated device to oxidize the organic sulfur in wastewater. The removal rate of organic sulfur in wastewater is higher than 99.0%, thereby removing the foul odor of the wastewater. For wastewater containing low concentrations of organic sulfur, only using a UV generator; for wastewater containing moderate concentrations of organic sulfur, using a combination of UV generator and ozone generator; for wastewater containing high concentrations of organic sulfur, further using catalyst to enhance purifying effectiveness. This method for treating sulfur-containing pollutant wastewater has a simple structure, energy conservation and environmental protection, cost savings, convenient operation, and excellent treatment effect. This method has high flexibility and can easily adjust process parameters according to the different situations of subsequent treatment of process effluent, treating sewage to different depths, thereby reducing operating costs. On the other hand, equipment integration is currently the preferred choice for most wastewater treatment, which effectively solves the problem of scattered natural gas well locations and difficulty in centralized treatment of sulfur-containing pollutant wastewater.

In summary, this disclosure provides a device 1000 and a method for treating sulfur-containing organic wastewater. The device 1000 includes a device body 100 with a reaction chamber 1, an energy supply unit 2, and a treatment unit 200. The energy supply unit 2 is used to provide power output to the device 1000, and the treatment unit 200 is used to purify and treat sulfur-containing organic wastewater with an initial concentration of organic sulfur to ensure that the organic sulfur content in the treated sulfur-containing organic wastewater is within a preset range, with the initial concentration ranging from $10^{-5}$ mg/L to 10000 mg/L; The device 1000 provided by this disclosure for treating sulfur-containing organic wastewater integrates energy supply unit 2 and treatment unit 200 into an integrated device 1000, and the treatment unit 200 is used to purify sulfur-containing organic wastewater with an initial concentration of organic sulfur, so that the organic sulfur content in the treated sulfur-containing organic wastewater is within the preset range to enable the device 1000 to efficiently purify and treat sulfur-containing organic wastewater with different initial concentrations of organic sulfur. The efficiency of purifying sulfur-containing organic wastewater can be improved to a certain extent, the purification cost can be reduced, and the competitiveness of enterprise can be enhanced.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for treating organic sulfur containing wastewater, comprising:
    providing a device for treating organic sulfur-containing wastewater, the device for treating organic sulfur-containing wastewater comprising a device body with a reaction chamber, an energy supply unit set outside the device body, and a treatment unit;
    adding organic sulfur-containing wastewater with an initial concentration of organic sulfur into the reaction chamber through an inlet of the device body, wherein the initial concentration ranges between $10^{-5}$ mg/L and 10000 mg/L;
    purifying the organic sulfur-containing wastewater through the treatment unit to ensure that organic sulfur content in the treated organic sulfur-containing wastewater is within a preset range;
    wherein: purifying the organic sulfur-containing wastewater through the treatment unit comprises: when the initial concentration ranges between $10^{-5}$ mg/L and 1 mg/L, only using ultraviolet generator in the treatment unit to purify the organic sulfur-containing wastewater; when the initial concentration ranges between 1 mg/L and 100 mg/L, using a combination of ultraviolet generator and ozone generator in the treatment unit to purify the organic sulfur-containing wastewater; when the initial concentration ranges between 100 mg/L and 10000 mg/L, adding catalyst to the organic sulfur-containing wastewater, and using a combination of UV generator and ozone generator in the treatment unit to purify the organic sulfur-containing wastewater.

2. The method for treating organic sulfur-containing wastewater according to claim 1, wherein before adding organic sulfur-containing wastewater with an initial concentration of organic sulfur into the reaction chamber through the inlet of the device body, the method for treating organic sulfur-containing wastewater further comprises:
    adjusting pH value of the organic sulfur-containing wastewater with the initial concentration of organic sulfur, so that the pH range of the organic sulfur-containing wastewater is between 6.5 and 7.5.

3. The method for treating sulfur-containing wastewater according to claim 1, wherein purifying the organic sulfur-containing wastewater through the treatment unit further comprises:
    when the initial concentration ranges between $10^{-5}$ mg/L and 1 mg/L, ultraviolet intensity range used by the ultraviolet generator to treat organic sulfur-containing wastewater per cubic meter volume is between 2000 W and 5000 W, and treatment time range is between 10 min and 20 min.

4. The method for treating organic sulfur-containing wastewater according to claim 1, wherein purifying the organic sulfur-containing wastewater through the treatment unit further comprises:
    when the initial concentration ranges between 1 mg/L and 100 mg/L, ultraviolet intensity range used by the ultraviolet generator to treat organic sulfur-containing wastewater per cubic meter volume is between 2000 W and 5000 W, and ozone concentration range used by the ozone generator to treat organic sulfur-containing wastewater per cubic meter volume is between 20 mg/L and 30 mg/L, treatment time for treating organic sulfur-containing wastewater by the treatment unit ranges from 20 minutes to 30 minutes.

5. The method for treating organic sulfur-containing wastewater according to claim 1, wherein purifying the organic sulfur-containing wastewater through the treatment unit further comprises:
    when the initial concentration ranges between 100 mg/L and 10000 mg/L, ultraviolet intensity range used by the ultraviolet generator to treat organic sulfur-containing wastewater per cubic meter volume is between 2000 W and 5000 W, and ozone concentration range used by the ozone generator to treat sulfur-containing wastewater per cubic meter volume is between 20 mg/L and 30 mg/L, treatment time for treating organic sulfur-containing wastewater by the treatment unit ranges from 20 minutes to 30 minutes; the catalyst is at least one of $TiO_2$, $ZnO$, $CdS$, $WO_3$, $SrTiO_3$, and $Fe_2O_3$, with a concentration of 100 mg/L of organic sulfur-containing wastewater.

* * * * *